Patented Aug. 10, 1948

2,446,903

UNITED STATES PATENT OFFICE 2,446,903

ASPHALTIC MOLDING MATERIAL

Elvin M. Bright, Milwaukee, Wis., assignor, by mesne assignments, to Fred A. Krause, West McHenry, Ill.

No Drawing. Application January 29, 1947, Serial No. 725,173

10 Claims. (Cl. 106—123)

This invention relates to plastic molding material and more particularly to a plastic molding material including petroleum products.

This application is a continuation-in-part of my application Serial No. 500,455 filed August 28, 1943, for Plastic, now abandoned.

Numerous plastic molding materials have been made and used utilizing asphalt as the main ingredient or as one of the ingredients. However, these have been limited in their use for one reason or another, as will appear more fully later.

An object of this invention is to utilize unstable plastic or semi-plastic materials that, upon being combined, result in a stable molding material.

Another object of this invention is to provide a plastic molding material made from cheap materials including petroleum asphalts, so compounded and treated that the resulting article has a high melting point, great tensile and compression strengths and desired resistance to impact.

Another object of this invention is to provide a thermo-plastic molding material that may be molded very rapidly and that sets quickly, so as to have a very short molding cycle.

Another object of this invention is to utilize in a molding compound two dissimilar petroleum asphalts having characteristics that complement each other, so as to produce the desired qualities in the plastic molding compound, which qualities are different from the qualities of the individual petroleum asphalts entering into the compound.

Another object of this invention is to produce a plastic molding material including at least two asphalts, one of which is extremely brittle at ordinary room temperature and the other semi-plastic or pliable at ordinary room temperature.

Another object of this invention is to utilize asphalts and lignin materials as molding materials, either with or without filler materials.

Another object of this invention is to provide a molding compound that is easily produced at a low cost and that may be used in molding articles from plastic molding compound, which articles may be used as substitutes for articles made from metals, et cetera.

Other objects and advantages reside in the ingredients used, the combination thereof and the mode of operation, as will become more apparent from the following description.

In view of the nature of the invention, no drawings are deemed necessary.

In the past, numerous attempts have been made to utilize asphalt materials as one of the ingredients of the molding compound. Some of these are objectionable, in that they soften and sag out of place during hot weather. Others may warp and bend or flex out of shape upon removal from the molds. Some of these molding compounds including asphalts have intermixed therewith other ingredients that tend to produce a fairly stable molding compound; but the ingredients used in stabilizing the asphalt have a very deleterious effect upon the molding apparatus and the molds, thereby making such compounds unsuitable for mass production. Some of the research engineers employed by oil refineries have made numerous attempts at producing asphalt molding materials.

One of the oil companies has developed a petroleum asphalt material of a synthetic nature, intended for use by the molding industry. At ordinary room temperature this asphalt material, which has a softening point around 290° F., is brittle. The specific gravity of this asphalt is 1.14; the viscosity (centipoises at 500° F.) is 130; and the penetration at 77° F. is nil. This compound is black with brownish tinge, is characterized by its extreme hardness at normal temperature and its very low viscosity at mixing and molding temperatures. It has further properties not readily classified by normal tests, including its ability to wet fibers and blend with the other components of the molding compound. Finally, this material is thermally stable, capable of withstanding the temperature at which the product must be processed and molded. In the past, this asphalt material has not been found acceptable to the molding industry.

The oil refineries also produce petroleum asphalts that at ordinary atmospheric temperatures are soft or semi-plastic. This material may be formed at ordinary room temperature; but it fails to hold its shape.

This semi-plastic petroleum asphalt material that is used as a plasticizer, has a softening point of 300, specific gravity 1.03, penetration at 77° F. 3, the color is black. This compound is a high softening point plasticizer, compatible with asphalt and other resinous components of the compound. Furthermore, the ratio between the two asphalt materials may be varied, so as to vary the characteristics of the ultimate molding compound. The two asphalt materials are, so to speak, compatible throughout the entire range of mixture, in spite of the fact that the two asphalt materials in the absence of each other are dissimilar asphalt materials. The resulting molding compound holds its shape, is not subject to softening at ordinary atmospheric temperatures, does not sag and does not fatigue in response to continuously applied pressure over a considerable period of time. Furthermore, the temperature and strength may be such that the molding compound may be used to withstand heats and pressures resulting from pasteurization, et cetera.

In addition to the asphalt materials, other ingredients are added. One of these which is essential to the product includes a derivative of lignin. This lignin product represents an isolated lignin prepared from hardwood soda black liquor, as fully disclosed in the Reboulet Patent No. 2,228,976, patented January 14, 1941, for "Molding material and method of producing same." This lignin derivative may be precipitated out of a black liquor of the soda process of manufacturing paper pulp by neutralizing said black liquor in its initial condition by passing a carbon dioxide containing gas therethrough, said neutralizing action being carried forward to a controlled pH value of approximately pH 7.8 to pH 9 to thereby precipitate from the black liquor said lignin material constituting a fraction up to approximately 25% of the total solids in said liquor.

The lignin separates in the form of an extremely fine precipitate which is coagulated on heating to 90° C., followed immediately by cooling to 40° C. The lignin thus precipitated is filtered, washed with water, with dilute sulphuric acid, and again with water, and is dried on a double drum drier. The dried, powdered product has an ash content of 0.5% and a moisture content of 2-4%. Its methoxyl content is 21.5%, which agrees well with values usually given for hardwood lignins. The carbon content of 64.4% and hydrogen content of 5.9% are within the range generally ascribed to these products. This lignin is soluble in pyridine, partly soluble in dioxane, acetone and alcohol, and insoluble or at best, only very slightly soluble in ether and petroleum ether.

The steps of producing the molding material includes first melting the 290° soft point asphalt by raising it to the desired temperature. For example, it may be heated to a temperature of 550° F. if found so desirable.

Next, powdered lignin derivative is added and is thoroughly intermixed at the above temperature. This mixing operation may require about 5 minutes and should be very thorough. The length of time required for the mixing operation depends upon the type of mixer and the quantity that is being mixed. It is not known whether the asphalt and lignin go into solution either in full or in part; but it is definitely known that there is at least some intermixing or fusion at this temperature, as it is well above the melting point of lignin. It is believed that this is the first molding material in which lignin and an asphalt base material are combined.

The next step consists of adding the plastic asphalt. The plastic asphalt is thoroughly intermixed with the combined lignin and the other asphalt. The entire mixture is in a very low viscosity form and seems to readily absorb any type of filler which may be added at this point. Before adding the filler, the three ingredients must be completely intermixed. Tests seem to indicate that if the temperature is raised to 600° F. no change in high heat resistance has been observed.

The next step is the addition of filler material, which may include silica. The silica at this temperature does not greatly increase the viscosity of the compound; but serves as a solid inert material, functioning as a tenacle-like structure, around which the mixture gathers to form a knitted or reenforced structure. The addition of the silica does not have a great effect on the temperature of the entire mixture, due to the fact that small quantities of silica are added and also due to the fact that heat is supplied to the mixture during the addition of the several ingredients.

Asbestos fibers, heated to a temperature of approximately 300° F. are next added. The reason for heating the asbestos fibers before adding to the mixture is to keep the fibers from cooling the mixture. When the mixture is not cooled, the fibers may be very thoroughly intermixed. Furthermore, the preheating of the asbestos fibers, in addition to giving a more complete impregnation of the fibers, also decreases the amount of time required for the mixing operation.

Before adding the asbestos fibers, the fibers are preferably treated. There may be a tendency for the asbestos fibers to mat, as a result of packing, storage and shipping. Furthermore, the fibers have a tendency to absorb moisture from the atmosphere. Before adding the asbestos fibers to the mixture, the asbestos fibers are preferably passed through a carding machine, where they are separated or disentangled. From the carding machine the asbestos fibers may be passed over a belt conveyor to a weighing station and from the weighing station they may be passed under a battery of infra-red lamps, or any other source of heat, to heat the fibers, to thereby expel the moisture from the fibers and increase the temperature of the fibers in readiness to be added to the mixture. When the fibers arrive at the mixing station, the fibers may have a temperature of 300° F. The fibers are added to the mixture and thoroughly intermixed therewith. For some purposes the heating and carding of the asbestos fibers is omitted without any noticeable evil effects.

The molding compound resulting from the intermixture of the asphalt, the lignin, the plasticizing asphalt, the silica and the asbestos fibers is preferably supplied to a calender machine provided with a roller having ridges or scoring extensions, projecting therefrom, which machine extrudes or calenders the asphalt material into a scored strip fed to a breaker that breaks the strip into small square pieces, suitable to be supplied to the molding machine.

The ratio of the ingredients depends upon the use to which the plastic molding material is to be put. The following is the formula that has been found satisfactory for a plastic molding compound.

|  | Parts by weight |
|---|---|
| 290° F. soft point asphalt | 66.8 |
| Plasticizer asphalt | 2.0 |
| Lignin, prepared from hardwood soda black liquor | 2.0 |
| Asbestos fiber, grade "blended" standard test (0-7-3/4-5¼-3) | 22.6 |
| Silica | 6.6 |

Instead of silica, as set forth above, a mixture of two parts of calcium magnesium carbonate and one part of calcium magnesium silicate may be used. These filler materials have the advantage of causing less wear on the molds than when silica is used.

The above ratios are illustrative. The ratios may be varied, thereby varying the characteristics of the molding material. For example, if the 290° F. soft point asphalt is increased, the plastic molding material is harder and at the same time somewhat more brittle. If the plasticizing asphalt is increased, the opposite takes place. Likewise, the other ingredients may be varied.

For some purposes, the amount of asbestos fibers may be changed, either increased or decreased or eliminated. For other purposes, the ratios of the other filler materials may be changed, or for that matter eliminated, again depending upon the nature of the article to be molded and upon its use. Instead of using asbestos and silica or calcium magnesium compounds, other filler materials may be used to meet the particular requirements, such as dolomite, which has been found to give excellent results when ground to a fineness of 400 mesh.

It has been found that the 290° F. soft point asphalt may be varied from 60 to 70 parts. The lignin may vary from 2 to 10 parts. The plasticizing asphalt may vary from 2 to 10 parts. The silica, the asbestos fibers, the calcium magnesium compounds or other filler materials may vary throughout extremely wide ranges.

The lignin has been referred to as having a pH value of approximately pH 7.8 to pH 9. Probably the best range is around pH 8.5 to pH 8.6.

Although the preferred embodiment of the process has been described, it will be understood that within the purview of this invention various changes may be made in the form, proportion and ingredients and the combination thereof, which generally stated consist in a method and a compound capable of carrying out the objects set forth, as disclosed and defined in the appended claims.

Having thus described my invention, I claim:

1. A plastic molding material consisting of 60 to 70 parts by weight of 290° F. soft point black with brownish tinge petroleum asphalt characterized by specific gravity 1.14, viscosity 130, penetration at 77° F. nil; 2 to 10 parts of a plasticizing black petroleum asphalt characterized by 300° F. soft point, specific gravity 1.03, penetration at 77° F. 3; 2 to 10 parts lignin derivative derived by neutralizing black liquor of the soda process of manufacturing paper pulp by passing carbon dioxide containing gas therethrough, said neutralizing action being carried forward to a controlled pH value of 7 pH to 9.6 pH to thereby precipitate from the black liquor said lignin derivative; and filler materials as required.

2. A plastic molding material consisting of 66.8 parts by weight of 290° F. soft point black with brownish tinge petroleum asphalt characterized by specific gravity 1.14, viscosity 130, penetration at 77° F. nil; 2 parts of a plasticizing black petroleum asphalt characterized by 300° F. soft point, specific gravity 1.03, penetration at 77° F. 3; 2 parts lignin derivative derived by neutralizing black liquor of the soda process of manufacturing paper pulp by passing carbon dioxide containing gas therethrough, said neutralizing action being carried forward to a controlled pH value of 7 pH to 9.6 pH to thereby precipitate from the black liquor said lignin derivative; and filler materials as required.

3. A plastic molding material consisting of 66.8 parts by weight of 290° F. soft point black with brownish tinge petroleum asphalt characterized by specific gravity 1.14, viscosity 130, penetration at 77° F. nil; 2 parts of a plasticizing black petroleum asphalt characterized by 300° F. soft point, specific gravity 1.03, penetration at 77° F. 3; 2 parts lignin derivative derived by neutralizing black liquor of the soda process of manufacturing paper pulp by passing carbon dioxide containing gas therethrough, said neutralizing action being carried forward to a controlled pH value of 7 pH to 9.6 pH to thereby precipitate from the black liquor said lignin derivative; 22.6 parts of asbestos fibers; and other filler material.

4. A plastic molding material consisting of 66.8 parts by weight of 290° F. soft point black with brownish tinge petroleum asphalt characterized by specific gravity 1.14, viscosity 130, penetration at 77° F. nil; 2 parts of a plasticizing black petroleum asphalt characterized by 300° F. soft point, specific gravity 1.03, penetration at 77° F. 3; 2 parts lignin derivative derived by neutralizing black liquor of the soda process of manufacturing paper pulp by passing carbon dioxide containing gas therethrough, said neutralizing action being carried forward to a controlled pH value of 7 pH to 9.6 pH to thereby precipitate from the black liquor said lignin derivative; 6.6 parts of silica; and fibrous filler material.

5. A plastic molding material consisting of 66.8 parts by weight of 290° F. soft point black with brownish tinge petroleum asphalt characterized by specific gravity 1.14, viscosity 130, penetration at 77° F. nil; 2 parts of a plasticizing black petroleum asphalt characterized by 300° F. soft point, specific gravity 1.03, penetration at 77° F. 3; 2 parts lignin derivative derived by neutralizing black liquor of the soda process of manufacturing paper pulp by passing carbon dioxide containing gas therethrough, said neutralizing action being carried forward to a controlled pH value of 7 pH to 9.6 pH to thereby precipitate from the black liquor said lignin derivative; 22.6 parts of asbestos fibers; and 6.6 parts of silica filler.

6. A plastic molding material consisting of 60 to 70 parts by weight of 290° F. soft point black with brownish tinge petroleum asphalt characterized by specific gravity 1.14, viscosity 130, penetration at 77° F. nil; 2 to 10 parts of a plasticizing black petroleum asphalt characterized by 300° F. soft point, specific gravity 1.03, penetration at 77° F. 3; 2 to 10 parts lignin derivative derived by neutralizing black liquor of the soda process of manufacturing paper pulp by passing carbon dioxide containing gas therethrough, said neutralizing action being carried forward to a controlled pH value of 7 pH to 9.6 pH to thereby precipitate from the black liquor said lignin derivative; and filler materials including a mixture of calcium magnesium carbonate and calcium magnesium silicate.

7. A plastic molding material consisting of 66.8 parts by weight of 290° F. soft point black with brownish tinge petroleum asphalt characterized by specific gravity 1.14, viscosity 130, penetration at 77° F. nil; 2 parts of a plasticizing black petroleum asphalt characterized by 300° F. soft point, specific gravity 1.03, penetration at 77° F. 3; 2 parts lignin derivative derived by neutralizing black liquor of the soda process of manufacturing paper pulp by passing carbon dioxide containing gas therethrough, said neutralizing action being carried forward to a controlled pH value of 7 pH to 9.6 pH to thereby precipitate from the black liquor said lignin derivative; and filler materials including a mixture of calcium magnesium carbonate and calcium magnesium silicate.

8. A plastic molding material consisting of 66.8 parts by weight of 290° F. soft point black with brownish tinge petroleum asphalt characterized by specific gravity 1.14, viscosity 130, penetration at 77° F. nil; 2 parts of a plasticizing black petroleum asphalt characterized by 300° F. soft point, specific gravity 1.03, penetration at 77° F. 3; 2 parts lignin derivative derived by neutralizing black liquor of the soda process of manufacturing paper pulp by passing carbon dioxide containing gas therethrough, said neutralizing action being carried forward to a controlled pH value of 7 pH to 9.6 pH to thereby precipitate from the black liquor said lignin derivative; 6.6 parts of a mixture consisting of 2 parts of calcium magnesium carbonate and one part of calcium magnesium silicate; and other fibrous filler materials.

9. A plastic molding material consisting of 66.8 parts by weight of 290° F. soft point black with brownish tinge petroleum asphalt characterized by specific gravity 1.14, viscosity 130, penetration at 77° F. nil; 2 parts of a plasticizing black petroleum asphalt characterized by 300° F. soft point, specific gravity 1.03, penetration at 77° F. 3; 2 parts lignin derivative derived by neutralizing black liquor of the soda process of manufacturing paper pulp by passing carbon dioxide containing gas therethrough, said neutralizing action being carried forward to a controlled pH value of 7 pH to 9.6 pH to thereby precipitate from the black liquor said lignin derivative; 22.6 parts of asbestos fibers; and 6.6 parts of a mixture consisting of 2 parts of calcium magnesium carbonate and one part calcium magnesium silicate.

10. A plastic molding material consisting of 66.8 parts by weight of 290° F. soft point black with brownish tinge petroleum asphalt characterized by specific gravity 1.14, viscosity 130, penetration at 77° F. nil; 2 parts of a plasticizing black petroleum asphalt characterized by 300° F. soft point, specific gravity 1.03, penetration at 77° F. 3; 2 parts lignin derivative derived by neutralizing black liquor of the soda process of manufacturing paper pulp by passing carbon dioxide containing gas therethrough, said neutralizing action being carried forward to a controlled pH value of 7 pH to 9.6 pH to thereby precipitate from the black liquor said lignin derivative; and filler materials including dolomite.

ELVIN M. BRIGHT.

REFERENCES CITED

The following references are of record in the file of this patent:

UNITED STATES PATENTS

| Number | Name | Date |
|---|---|---|
| 2,399,411 | Watts et al. | Apr. 30, 1946 |
| 2,392,163 | Lewis | Jan. 1, 1946 |
| 2,386,163 | Holmes et al. | Oct. 2, 1945 |
| 2,355,180 | Remy | Aug. 8, 1944 |
| 2,354,593 | Greider et al. | July 25, 1944 |
| 2,214,904 | Johnson | Sept. 17, 1940 |
| 1,711,544 | Sato | May 7, 1929 |

OTHER REFERENCES

Industrial & Engineering Chemistry, vol. 32, 1940, No. 10, pages 1399–1400.